United States Patent [19]
Thakore

[11] 3,721,884
[45] March 20, 1973

[54] SINGLE TRANSISTOR OSCILLATOR BLASTING DEVICE

[75] Inventor: Kaushik H. Thakore, Sidney, N.Y.

[73] Assignee: The Bendix Corporation, Southfield, Mich.

[22] Filed: Nov. 23, 1971

[21] Appl. No.: 201,519

[52] U.S. Cl. ................320/1, 307/108, 317/80, 331/111
[51] Int. Cl. ...................H03k 3/30, H02m 3/22
[58] Field of Search ............320/1; 331/111; 317/80; 307/108

[56] References Cited

UNITED STATES PATENTS

| | | | |
|---|---|---|---|
| 3,531,738 | 9/1970 | Thakore | 331/111 |
| 3,331,033 | 7/1967 | Johnston | 331/111 |
| 2,826,693 | 3/1958 | Resnik | 320/1 X |
| 3,541,393 | 11/1970 | Diswood | 320/1 X |
| 3,331,034 | 7/1967 | Massoll | 331/111 |
| 3,223,887 | 12/1965 | Brown | 320/1 X |

Primary Examiner—Bernard Konick
Assistant Examiner—Stuart Hecker
Attorney—Raymond J. Eifler et al.

[57] ABSTRACT

A blasting apparatus for firing an explosive bridge wire device or the like comprising a d.c. to d.c. converter circuit that utilizes only one transistor in the oscillator portion of the circuit to transfer energy from a battery to a storage capacitor which is automatically discharged upon reaching a predetermined energy level. The circuit also includes a single switch which in the OFF position discharges the storage capacitor and in the ON position connects the battery to the primary winding of the transformer to charge the storage capacitor.

30 Claims, 1 Drawing Figure 3,721,884
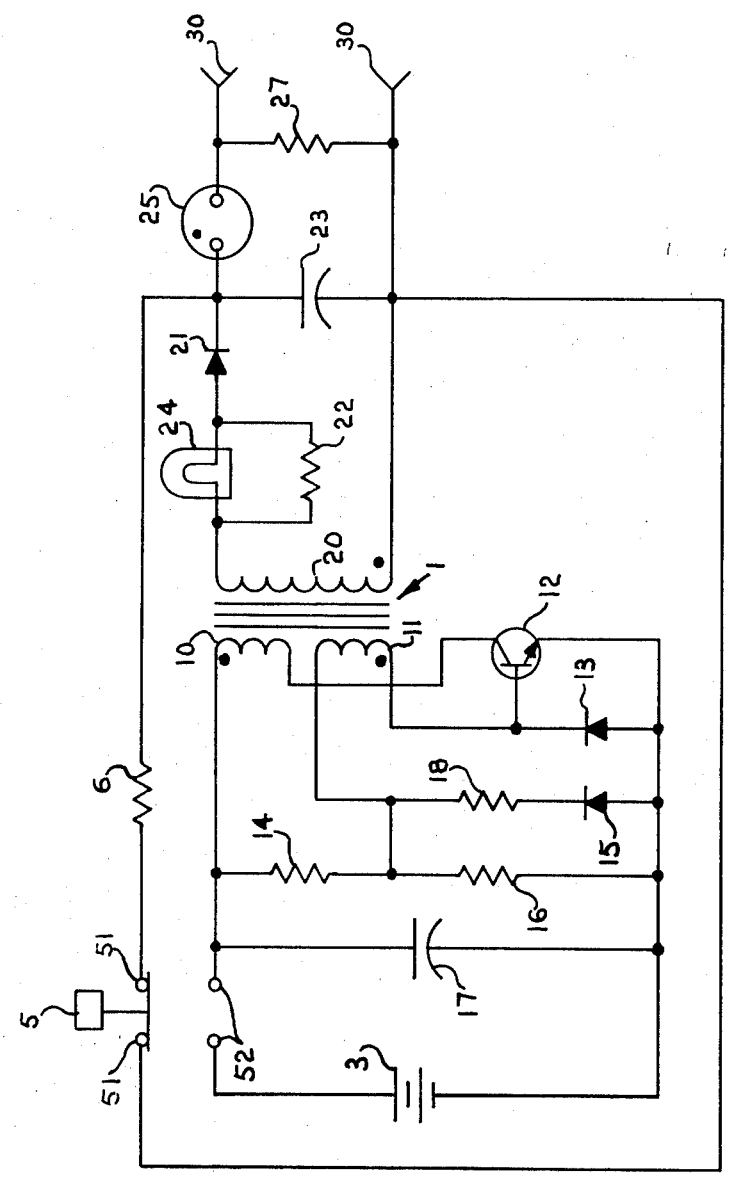

SINGLE TRANSISTOR OSCILLATOR BLASTING DEVICE

BACKGROUND OF THE INVENTION

This invention relates to an electrical apparatus and more particularly to a battery powered electrical circuit for charging a capacitor that is used for firing an explosive bridge wire device or the like.

Basically, electrical systems for firing explosive devices include a source of power such as a battery, an oscillator, a transformer responsive to the oscillator for stepping up the pulses therefrom, and a storage capacitor which is charged by the pulses from the transformer, and discharged to fire an explosive device. The power stored in the capacitor is discharged through a load by means of a triggering circuit which may be operated automatically or manually. Examples of such blasting devices may be found in U.S. Pat. No. 3,417,306 entitled "Regulated Voltage Capacitor Discharge Circuit" to J. L. Knak, issued Dec. 17, 1968, and U.S. Pat. No. 3,275,884 entitled "Electrical Apparatus for Generating Current Pulses" to L. H. Segall et al., issued Sept. 27, 1966.

SUMMARY OF THE INVENTION

This invention provides a battery powered blasting machine that utilizes a single transistor oscillator circuit for charging a capacitor to a predetermined energy level where it is automatically discharged to fire an explosive bridge wire device or the like.

The invention is a battery powered blasting machine characterized by an electrical circuit which includes a transformer having a primary winding and a control winding in electrical circuit relationship with a single transistor oscillating circuit. The secondary circuit of the transformer circuit is characterized by a storage capacitor and a normally nonconducting gaseous conductor which conducts to allow the capacitor to discharge when the capacitor has reached a predetermined energy level. An additional feature of this circuit is a discharge resistor in series with the control switch which in the ON position, allows the capacitor to charge to the predetermined energy level and which, in the OFF position, discharges the energy in the capacitor through the resistor.

In one embodiment of the invention, the blasting machine comprises: A battery; a transformer having a primary winding in electrical circuit relationship with the battery, a control winding on the primary side of the transformer, and a secondary winding; a diode and capacitor connected together in series across the secondary winding of the transformer to store energy generated by the current flowing through the primary winding; a normally nonconducting two-electrode spark gap device connected in series with a resistor, the spark gap and resistor being connected in parallel with the capacitor, the spark device operable to be conductive when the capacitor reaches a predetermined voltage whereby the energy in the capacitor may be discharged when the capacitor reaches the predetermined voltage level; a solid state switch oscillator connected to the battery and the primary and control windings of the transformer to periodically interrupt current from the battery through the primary winding and thereby transfer energy to the capacitor, the oscillator including: a transistor having collector and emitter terminals in series with the primary winding, the transistor having alternate conductive and nonconductive intervals to periodically interrupt the current flow from the primary winding, a first voltage divider network connected across the transistor in the primary winding, the first voltage divider network including a first and second series connected resistors connected across the primary winding and the transistor, a third resistor, and second diode means connected in series with the third resistor, the second diode means and the third resistor connected in parallel with the second resistor and in circuit relationship with the transistor base and the control winding to direct current from the control winding in a predetermined manner; and switching means for connecting and disconnecting the battery to the transformer, the switching means including a resistor in series with the switching means and wherein a single switching means is provided which connects the storage capacitor in the transformer secondary circuit across the resistor in its OFF position and disconnects the resistor from across the capacitor in its ON position whereby the energy in the capacitor is discharged when the switch is in the OFF position.

Accordingly, it is an object of this invention to provide a battery powered blasting machine that includes a single transistor oscillator circuit.

It is another object of this invention to provide a safe and reliable blasting apparatus which does not discharge its energy until the capacitor has reached a predetermined energy level.

Still another object of the present invention is to provide a blasting apparatus that includes a single switch for charging the storage capacitor to a predetermined energy level and for discharging that same capacitor when the blasting apparatus is not in use.

Another object of this invention is to provide a novel electrical system for automatically firing electrically energized squibs and like firing units such as explosive bridge wire devices.

A still further object of this invention is to provide a blasting apparatus that includes a circuit with a minimum number of components to achieve a maximum power transfer to a storage capacitor.

A still further object of this invention is to provide a blasting apparatus whereby a capacitor may be rapidly charged to a predetermined voltage level and be automatically discharged at that level to fire an explosive bridge wire device or the like.

The above and other objects and features of the invention will become apparent from the following detailed description taken in conjunction with the accompanying drawings and claims which form a part of this specification.

BRIEF DESCRIPTION OF THE DRAWING

The single FIGURE is a schematic diagram of a battery powered blasting machine that accomplishes the objects of this invention.

DETAILED DESCRIPTION OF THE DRAWING

The single FIGURE illustrates a preferred embodiment of the circuit that embodies the principles of this invention. The circuit includes a battery 3, an oscillator circuit which includes a transformer 1, a storage capacitor 23, output terminals 30 and a charge and discharge switch 5. Turning now to the primary side of the transformer 1, the transformer primary side includes two windings, a primary winding 10 and a control winding 11. In series with the primary winding 10 is an npn transistor 12. Across the power source 3 is a voltage divider network that includes two series connected resistors 14, 16. Connected in parallel with resistor 16 is a third resistor 18 and diode 15. Control winding 11 and diode 13 are in series and connected across resistor 16 of the voltage divider network. To bias the transistor 12 an electrical connection extends between the junction of the control winding 11 and diode 13 to the base of the transistor 12. To connect and disconnect the power source 3 from the circuitry a normally open switch 5 is located in series with the battery. A smoothing capacitor 17 has also been added to the circuit across the battery 3.

Turning now to the secondary side of the transformer, the circuit includes secondary winding 20, a blocking diode 21, and a storage capacitor 23 for storing the energy transferred from the primary to the secondary winding of the transformer. An indicator light 24 is located in series with the secondary winding 20 and will give a visual indication when the storage capacitor 23 is being charged. In this particular circuit an automatic discharge of the capacitor 23 is obtained by placing a gaseous conductor 25, such as a two-electrode spark gap device, of a predetermined voltage in series with resistor 27 which, in turn, are both in parallel with the storage capacitor 23. The output terminals 30 may be connected to an explosive bridge wire device or the like so that when the gaseous conductor 25 breaks down and the energy from the capacitor 23 discharges the explosive devices (not shown) will be detonated.

An additional feature of the circuit is the switch 5 that has two sets of contacts 51, 52. In the ON position switch 5 connects contacts 52 together to supply energy to the oscillator circuit and, therefore, the storage capacitor 23. In the OFF position switch 5 connects terminals 51 together which connects a resistor 6 across storage capacitor 23 to discharge the capacitor when the blasting device is not in use.

OPERATION

Referring now to the Figure, the circuit operates as follows: When switch 5 is OFF no power is supplied to the primary winding in the transformer 1 and the capacitor 23 is discharged. When the switch 5 is in the ON position, power from battery 3 is supplied to the transformer 1 and transistor 12. The transistor 12, which is of the npn type, is conductive when its base voltage exceeds the emitter voltage plus the b-e voltage drop (0.7v.), and is nonconductive with the opposite occurs. The circuit parameters, that is, the values of the resistors 14 and 16, the resistances of primary winding 10 and tertiary of control winding 11, and the characteristics of diode 15 are such that when the switch 5 is closed the transistor 12 is conductive. Electrical energy drawn from the battery 3 is stored in the primary winding 10 of the transformer 1 during the ON or conduction period of the transistor 12. As the conduction period begins, the transistor 12 is driven into saturation, and a constant voltage appears across the primary 10 of the transformer 1. Because of the inductance of the transformer, the constant primary voltage thereof produces a linearly rising current in the primary 10 and such current, in turn, induces a constant voltage in the base of the transistor, and the tertiary 11 and the secondary winding 20 of the transformer 1. Since the polarity of the voltage induced in the secondary winding 20 does not allow the rectifier 21 to conduct, such secondary winding 20 is open circuited. The base voltage of the transistor 12 produces a constant base current that determines the maximum current flowing through the primary 10 of the transformer 1 and transistor 12.

Since the base current of the transistor is constant during the conduction period of the transistor 12, the linearly rising collector current will reach a value equal to $\beta \cdot I_b$. At this time the voltage induced in the primary 10 of the transformer 1 will drop to zero, since the collector current cannot exceed $\beta \cdot I_b$. This drop in the voltage induced in the primary winding 10 starts a regeneration action which drives the transistor 12 into the cutoff region. As the current flowing through primary winding 10 drops, the polarity of the voltage induced in the secondary winding 20 of the transformer 1 is reversed, allowing the diode 21 to conduct and to supply energy to the storage capacitor 23. Thus, electrical energy which is fed to the primary winding 10 during the conducting period of the transistor 12 is transferred to the load circuit during the nonconducting period of the transistor 12.

As the current flowing through primary winding 10 drops, the voltage induced in the control or tertiary winding 11 is also reversed; such reversal of the voltage in winding 11 holds the transistor 12 in its nonconducting condition. Such reverse voltage condition in winding 11 remains until the energy stored in the transformer 1 is transferred to the storage capacitor 23. The inverter circuit is thus restored to its initial condition, and its above described operating cycle is then repeated.

In one satisfactorily operable system, the blasting machine shown in the single figure was powered by six 1.5 volt D-size batteries or one 12-volt Delco Energizer No. S-121 battery and the circuit elements had the values or were of the types indicated as follows:

| | |
|---|---|
| Resistor 6 | ohms 5K; 10W |
| Resistor 14 | ohms 2.2K; 3 ¼W |
| Resistor 16 | ohms 1K; 3 ¼W |
| Resistor 18 | ohms 47; 5W |
| Resistor 22 | ohms 6.8K; 3 ¼W |
| Resistor 27 | ohms 3.9K; 5W |
| Diode 13 | IN486B or GE A14F |
| Diode 15 | IN486B or GE A14F |
| Diode 21 | MR 995A (Motorola) |
| Transistor 12 | Beta 25-35 (npn) 2N3055 |
| Transformer 1 | H115 Core 5 Mil air gap pri 48T No. 21 control 48T No. 25 secondary 3600T No. 40 |
| Switch 5 | 4 Contact −2 ON −2 OFF |
| Capacitor 17 | 160 Mf 50 VDC |
| Capacitor 23 | 12 Mf 2500 VDC |
| Indicator Light 24 | GE NE51H 115 VAC |
| Spark Discharge Device | 2 Electrode spark gap No. 10-392499-B14 Bendix Corp. Sidney, N.Y. 2000-2100 V Breakdown potential |

There is thus provided a novel and useful apparatus and method for charging and discharging an electrical condenser with maximum efficiency and safety. The novel system provided is useful in the ignition of explosive bridge wire type devices, shunted surface gap type devices, and other types of initiators or squibs. In addition, the circuit is extremely reliable and may be packaged in a small space.

Although only a single embodiment of the apparatus including the invention has been illustrated in the accompanying drawings and described in the foregoing specification, it is expressly understood that the invention is not limited thereto. It will be apparent to those skilled in the art that changes may be made to the invention as set forth in the appended claims, and, in some cases, certain features of the invention may be used to advantage without corresponding use of other features. For example, the circuit may also include a voltage regulator circuit for controlling the voltage within a given range. Accordingly, it is intended that the illustrative and descriptive materials herein be used to illustrate the principles of the invention and not to limit the scope thereof.

Having described the invention, what is claimed is:

1. A blasting apparatus which comprises:

a source of electrical energy;

a transformer having a primary winding in electrical circuit relationship with said source, a control winding on the primary side of said transformer, and a secondary winding;

first diode means and electrical energy storage means connected together in series across said secondary winding to store energy generated by the current flowing through said primary winding; and a solid state switch oscillator connected to said source and said primary and control winding of said transformer to periodically interrupt current flow from said source through said primary winding and thereby transfer energy to said energy storage means, said oscillator including:

a transistor having collector and emitter terminals in series with said primary winding, and the base terminal connected directly to one end of said control winding, said transistor having alternate conductive and nonconductive intervals to periodically interrupt the current flow from said primary winding;

a first voltage divider network connected in parallel with said source and connected across said transistor and said primary winding, said first voltage divider network comprising:

a first and second series connected resistor connected across said primary winding and said transistor;

a third resistor; and second diode means connected in series with said third resistor, said second diode means and said third resistor connected in parallel with said second resistor connected to the other end of said control winding; and third diode means connected directly across said transistor base and emitter terminals to direct current from said control winding in a predetermined manner.

2. A blasting apparatus as recited in claim 1 including first switching means for disconnecting said source of electrical energy from said transformer.

3. The blasting apparatus as recited in claim 2 including a resistor in series with a second switching means and wherein a single switching means comprising said first and said second switching means is provided which connects said energy storage means in said transformer secondary circuit across said resistor in its OFF position and disconnects said resistor from across said energy storage means in its ON position whereby said energy storage means is discharged when said switch is in its OFF position.

4. The blasting apparatus as recited in claim 1 wherein said secondary circuit of said transformer includes a normally nonconducting gaseous conductor connected in series with a resistor, said gaseous conductor and resistor being connected in parallel with said energy storage means, said gaseous conductor operable to be conductive when said energy storage means reaches a predetermined energy level whereby the energy in said energy storage means may be discharged when said storage means reaches said predetermined energy storage level.

5. A blasting apparatus as recited in claim 4 including first switching means for disconnecting said source of electrical energy from said transformer.

6. The blasting apparatus as recited in claim 5 including a resistor in series with a second switching means and wherein a single switching means comprising said first and said second switching means is provided which connects said energy storage means in said transformer secondary circuit across said resistor in its OFF position and said resistor from across said energy storage means in its ON position whereby said energy storage means is discharged when said switch is in its OFF position.

7. The blasting apparatus as recited in claim 1 wherein said source of electrical energy is a direct current source.

8. The blasting apparatus as recited in claim 7 wherein said secondary circuit of said transformer includes a normally nonconducting gaseous conductor connected in series with a resistor, said gaseous conductor and resistor being connected in parallel with said energy storage means, said gaseous conductor operable to conductive when said energy storage means reaches a predetermined energy level whereby the energy in said energy storage means may be discharged when said storage means reaches said predetermined energy storage level.

9. A blasting apparatus as recited in claim 7 including first switching means for disconnecting said source of electrical energy from said transformer.

10. The blasting apparatus as recited in claim 9 including a resistor in series with a second switching means and wherein a single switching means comprising said first and said second switching means is provided which connects said energy storage means in said transformer secondary circuit across said resistor in its OFF position and disconnects said resistor from across said energy storage means in its ON position whereby said energy storage means is discharged when said switch is in its OFF position.

11. The blasting apparatus as recited in claim 7 wherein the anodes of said second and third diodes are connected in circuit relationship with said negative end of said direct current source.

12. A blasting apparatus as recited in claim 11 including first switching means for disconnecting said source of electrical energy from said transformer.

13. The blasting apparatus as recited in claim 12 including a resistor in series with a second switching means and wherein a single switching means comprising said first and said second switching means is provided which connects said energy storage means in said transformer secondary circuit across said resistor in its OFF position and disconnects said resistor from across said energy storage means in its ON position whereby said energy storage means is discharged when said switch is in its OFF position.

14. The blasting apparatus as recited in claim 11 wherein said secondary circuit of said transformer includes a normally nonconducting gaseous conductor connected in series with a resistor, said gaseous conductor and resistor being connected in parallel with said energy storage means, said gaseous conductor operable to be conductive when said energy storage means reaches a predetermined energy level whereby the energy in said energy storage means may be discharged when said storage means reaches said predetermined energy storage level.

15. A blasting apparatus as recited in claim 14 including first switching means for disconnecting said source of electrical energy from said transformer.

16. The blasting apparatus as recited in claim 15 including a resistor in series with a second switching means and wherein a single switching means comprising said first and said second switching means is provided which connects said energy storage means in said transformer secondary circuit across said resistor in its OFF position and disconnects said resistor from across said energy storage means in its ON position whereby said energy storage means is discharged when said switch is in its OFF position.

17. The blasting apparatus as recited in claim 7 wherein said source of electrical energy is at least one battery.

18. The blasting apparatus as recited in claim 17 wherein said secondary circuit of said transformer includes a normally nonconducting gaseous conductor connected in series with a resistor, said gaseous conductor and resistor being connected in parallel with said energy storage means, said gaseous conductor operable to be conductive when said energy storage means reaches a predetermined energy level whereby the energy in said energy storage means may be discharged when said storage means reaches said predetermined energy storage level.

19. A blasting apparatus as recited in claim 18 including first switching means for disconnecting said source of electrical energy from said transformer.

20. The blasting apparatus as recited in claim 19 including a resistor in series with a second switching means and wherein a single switching means comprising said first and said second switching means is provided which connects said energy storage means in said transformer secondary circuit across said resistor in its OFF position and disconnects said resistor from across said energy storage means in its ON position whereby said energy storage means is discharged when said switch is in its OFF position.

21. The blasting apparatus recited in claim 17 including electrical energy storage means connected across said first voltage divider means.

22. The blasting apparatus as recited in claim 21 wherein said secondary circuit of said transformer includes a normally nonconducting gaseous conductor connected in series with a resistor, said gaseous conductor and resistor being connected in parallel with said energy storage means, said gaseous conductor operable to be conductive when said energy storage means reaches a predetermined energy level whereby the energy in said energy storage means may be discharged when said storage means reaches said predetermined energy storage level.

23. A blasting apparatus as recited in claim 21 including first switching means for disconnecting said source of electrical energy from said transformer.

24. The blasting apparatus as recited in claim 23 including a resistor in series with a second switching means and wherein a single switching means comprising said first and said second switching means is provided which connects said energy storage means in said transformer secondary circuit across said resistor in its OFF position and disconnects said resistor from across said energy storage means in its ON position whereby said energy storage means is discharged when said switch is in its OFF position.

25. The blasting apparatus as recited in claim 21 wherein the anodes of said second and third diodes are connected in circuit relationship with said negative end of said direct current source.

26. A blasting apparatus as recited in claim 25 including first switching means for disconnecting said source of electrical energy from said transformer.

27. The blasting apparatus as recited in claim 26 including a resistor in series with a second switching means and wherein a single switching means comprising said first and said second switching means is provided which connects said energy storage means in said transformer secondary circuit across said resistor in its OFF position and disconnects said resistor from across said energy storage means in its ON position whereby said energy storage means is discharged when said switch is in its OFF position.

28. The blasting apparatus as recited in claim 25 wherein said secondary circuit of said transformer includes a normally nonconducting gaseous conductor connected in series with a resistor, said gaseous conductor and resistor being connected in parallel with said energy storage means, said gaseous conductor operable to be conductive when said energy storage means reaches a predetermined energy level whereby the energy in said energy storage means may be discharged when said storage means reaches said predetermined energy storage level.

29. A blasting apparatus as recited in claim 28 including first switching means for disconnecting said source of electrical energy from said transformer.

30. The blasting apparatus as recited in claim 29 including a resistor in series with a second switching means and wherein a single switching means comprising said first and said second switching means is provided which connects said energy storage means in said transformer secondary circuit across said resistor in its OFF position and disconnects said resistor from across said energy storage means in its ON position whereby said energy storage mean is discharged when said switch is in its OFF position.

* * * * *